United States Patent [19]

Nakano et al.

[11] Patent Number: 4,907,184
[45] Date of Patent: Mar. 6, 1990

[54] ARITHMETIC OPERATION CIRCUIT

[75] Inventors: Tetsuo Nakano, Tokyo; Masahiro Iwamura; Kozaburo Kurita, both of Hitachi, all of Japan

[73] Assignee: Hitachi, Ltd., Tokyo, Japan

[21] Appl. No.: 132,368

[22] Filed: Dec. 14, 1987

[30] Foreign Application Priority Data

Dec. 26, 1986 [JP] Japan .................... 61-308456

[51] Int. Cl.$^4$ .............................................. G06F 7/50
[52] U.S. Cl. ...................................... 364/736; 364/784; 307/472
[58] Field of Search ................. 364/736, 768, 784; 307/248, 570, 446, 472

[56] References Cited

U.S. PATENT DOCUMENTS

| | | | |
|---|---|---|---|
| 3,609,479 | 9/1971 | Lin et al. .................. | 307/446 X |
| 4,558,234 | 12/1985 | Suzuki et al. ............. | 307/446 |
| 4,678,943 | 7/1987 | Uragami et al. ........... | 307/473 |
| 4,694,202 | 9/1987 | Iwamura et al. ........... | 307/475 |
| 4,694,203 | 9/1987 | Uragami et al. ........... | 307/446 |
| 4,719,373 | 1/1988 | Masuda et al. ............ | 307/570 |
| 4,725,745 | 2/1988 | Kondo et al. .............. | 307/465 |
| 4,733,110 | 3/1988 | Hara et al. ................ | 307/446 |

OTHER PUBLICATIONS

Hotta et al., "CMOS/Bipolar Circuits for 60–MHZ Digital Processing", IEEE Journal of Solid–State Circuits, vol. SC–21, No. 5, Oct. 1986, pp. 802–812.

Primary Examiner—Gary V. Harkcom
Assistant Examiner—Tan V. Mai
Attorney, Agent, or Firm—Antonelli, Terry & Wands

[57] ABSTRACT

An arithmetic operation circuit is provided which includes a logic processing circuit having a first metal-oxide-semiconductor-field-effect-transistor (MOSFET) column cascade-connecting a plurality of MOSFETs and a second MOSFET column cascade-connecting a plurality of MOSFETs. First and second ends of the second MOSFET column are respectively connected to first and second ends of said first column. A first power supply voltage is coupled to the common connecting point of the first ends of said first and second MOSFET columns. An amplifying circuit, including the grounded emitter type bipolar transistor, is provided such that the base thereof is connected to the common connecting point of the second ends of said first and second MOSFET columns.

25 Claims, 5 Drawing Sheets

ARITHMETIC OPERATION CIRCUIT

BACKGROUND OF THE INVENTION

The present invention relates to semiconductor integrated circuit, and moreover to technology which is effective when adopted to a composite logic circuit consisting of CMOS device and bipolar transistor. It is also directed to technology which is effective when adopted, for example to an arithmetic operation circuit forming the arithmetic operation logic unit of microcomputer.

Figure 4:
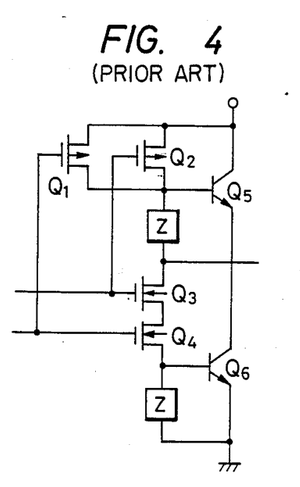
FIG. 4 is a circuit diagram indicating an example of the Bi-CMOS basic logic circuit.

As a logic gate circuit which requires larger load driving force than that of CMOS (complementary MOS) circuit and less power consumption than that of bipolar logic circuit, a composite logic gate circuit (hereinafter called a Bi-CMOS logic circuit) as indicated in FIG. 4 has been proposed (e.g., see Nikkei Electronics, from page 188 to page 189, issued on Aug. 12, 1985, Nikkei Mcgrowhill), in which the output part is formed by a totem pole type buffer consisting of bipolar transistors $Q_5$, $Q_6$ and the input logic part LG which controls such an output part is formed by P-MOS $Q_1$, $Q_2$ and N-MOS $Q_3$, $Q_4$.

Said Bi-CMOS logic circuit is capable of sufficiently utilizing the advantages in high speed operation and low power consumption in case it is adopted to an input-/output buffer, a bus driver and a clock driver, etc. having a large load.

SUMMARY OF THE INVENTION

The inventors of the present invention have discussed whether it is possible or not to realize high speed arithmetic operation by adopting the Bi-CMOS logic circuit to the arithmetic operation logic unit of CMOS microcomputer.

Figure 5:
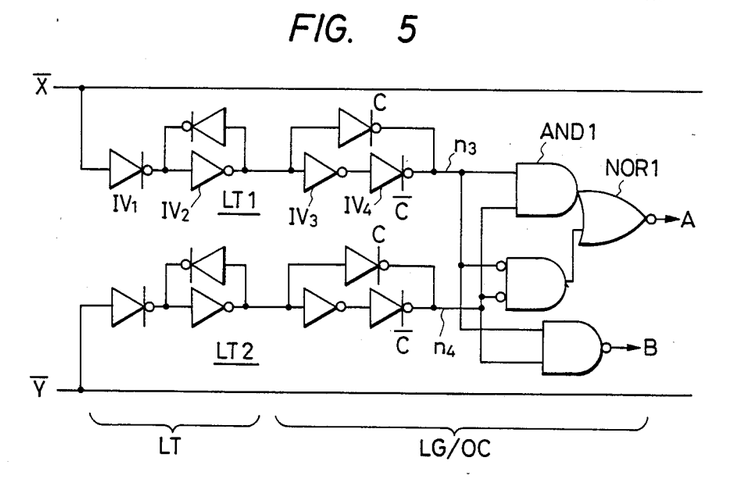
FIG. 5 is a circuit diagram indicating an example of an arithmetic operation circuit for an arithmetic operation logic unit discussed prior to the present invention.

The arithmetic operation logic unit employing the CMOS circuit can be formed by combining an arithmetic operation circuit, for example, as indicated in FIG. 5, consisting of the input latch part LT and logic/output part LG/OC.

The truth value table of arithmetic operation circuit indicated in FIG. 5 is indicated as Table 1 and Table 2.

TABLE 1

Truth Value Table with $C = 1$, $\overline{C} = 0$ in Logic Diagram of FIG. 5

| X | $\overline{X}$ | Y | $\overline{Y}$ | $n_3$ | $n_4$ | A | B |
|---|---|---|---|---|---|---|---|
| 1 | 0 | 1 | 0 | 1 | 1 | 0 | 0 |
| 1 | 0 | 0 | 1 | 1 | 0 | 1 | 1 |
| 0 | 1 | 1 | 0 | 0 | 1 | 1 | 1 |
| 0 | 1 | 0 | 1 | 0 | 0 | 0 | 1 |

TABLE 2

Truth Value Table with $C = 0$, $\overline{C} = 1$ in Logic Diagram of FIG. 5

| X | $\overline{X}$ | Y | $\overline{Y}$ | $n_3$ | $n_4$ | A | B |
|---|---|---|---|---|---|---|---|
| 1 | 0 | 1 | 0 | 0 | 0 | 0 | 1 |
| 1 | 0 | 0 | 1 | 0 | 1 | 1 | 1 |
| 0 | 1 | 1 | 0 | 1 | 0 | 1 | 1 |
| 0 | 1 | 0 | 1 | 1 | 1 | 0 | 0 |

Said CMOS arithmetic operation circuit is formed by cascade-connected six stages of a CMOS circuit and has a large number of stages of logic circuits. For example, the invertors IV1, IV2, IV3 and IV4, AND gate AND 1 and NOR gate NOR1 are cascade-connected in order to form an output signal A based on the input signal $\overline{X}$. However, a load capacity driven by the output signal A is generally very small. Therefore, the operation speed of said arithmetic operation circuit is defined by a number of stages of logic circuits and the speed of CMOS gate. Accordingly, the inventors of the present invention have made it obvious by investigation that high speed operation of arithmetic operation circuit cannot be realized even when the Bi-CMOS logic circuit is only adopted to such arithmetic operation circuit for driving a small load.

It is therefore an object of the present invention to provide a semiconductor integrated circuit technology to realize high speed operation of low power consumption type arithmetic operation circuit without losing the advantage of low power consumption.

These and further objects and novel characteristics of the present invention will become apparent from the following description taken in conjunction with the preferred embodiment thereof with reference to the accompanying drawings.

The invention disclosed in the present specification is outlined as described below.

Namely, an arithmetic operation circuit is formed by an input latch part which is formed by a CMOS inverter circuit and forms and maintains the complementary signal of the input signal, a logic processing part consisting of N-MOS switch array which is controlled for ON and OFF with the signal latched by such input latch part and carries out logic operations, and an amplifier part which is formed by a grounded emitter type bipolar transistor and amplifies logic output having small amplitude obtained by said logic processing part.

According to said means, since change of amplitude of signal obtained by the logic processing part is amplified by high transmission conductance characteristic corresponding to $g_m$ of MOSFET of the bipolar transistor, amplitude of logic output in the logic processing part consisting of N-MOS switch array can be lowered and the processing can be done only with the one stage of logic circuit. Thereby, said object of realizing high speed operation of logic circuit of low power consumption type can be attained by execution of logic operations without any delay.

DESCRIPTION OF THE PREFERRED EMBODIMENTS

Figure 1:
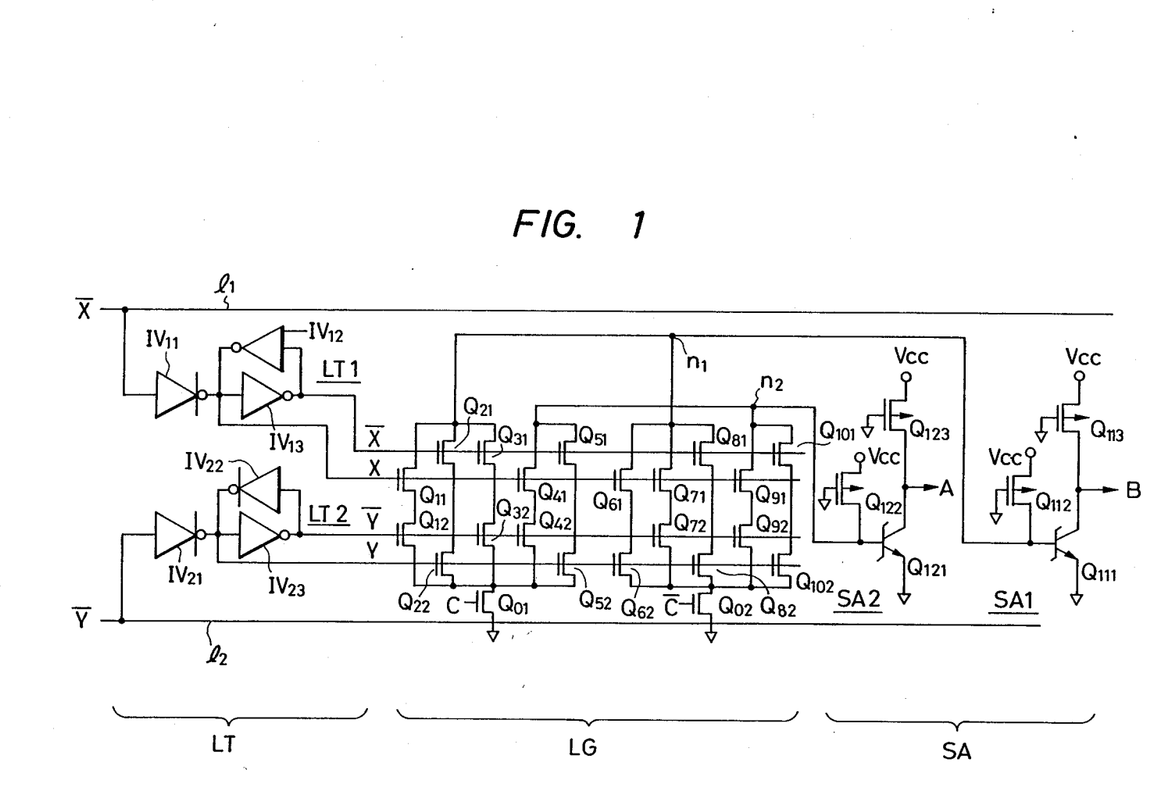
FIG. 1 is a circuit diagram indicating an embodiment of the arithmetic operation circuit of the present invention.

FIG. 1 is an embodiment of the arithmetic operation circuit of the present invention.

Each circuit element in the same figure formed, for example, on a semiconductor substrate such as a single crystal silicon by the well known Bi-CMOS circuit technology. Moreover, the arithmetic operation circuit of FIG. 1 is used, for example, as a circuit which forms ALU (Arithmetic operation Logic Unit) such as 1-chip microcomputer or microprocessor.

The truth value tables of the circuit indicated as FIG. 1 are given as the Table 3 and Table 4.

TABLE 3

| Truth Value Table with $C = 1$, $\bar{C} = 0$ in Circuit Diagram of FIG. 1 | | | | | | | |
|---|---|---|---|---|---|---|---|
| X | $\bar{X}$ | Y | $\bar{Y}$ | $n_1$ | $n_2$ | A | B |
| 1 | 0 | 1 | 0 | 1 | 1 | 0 | 0 |
| 1 | 0 | 0 | 1 | 0 | 0 | 1 | 1 |
| 0 | 1 | 1 | 0 | 0 | 0 | 1 | 1 |
| 0 | 1 | 0 | 1 | 0 | 1 | 0 | 1 |

TABLE 4

| Truth Value Table with $C = 0$, $\bar{C} = 1$ in Circuit Diagram of FIG. 1 | | | | | | | |
|---|---|---|---|---|---|---|---|
| X | $\bar{X}$ | Y | $\bar{Y}$ | $n_1$ | $n_2$ | A | B |
| 1 | 0 | 1 | 0 | 0 | 1 | 0 | 1 |
| 1 | 0 | 0 | 1 | 0 | 0 | 1 | 1 |
| 0 | 1 | 1 | 0 | 0 | 0 | 1 | 1 |
| 0 | 1 | 0 | 1 | 1 | 1 | 0 | 0 |

The values of output signals A, B indicated in said Table 1 match the values of output signals A, B in said Table 3. Moreover, the values of output signals A, B in said Table 2 match the values of output signals A, B in said Table 4. Therefore, the arithmetic operation circuit of FIG. 1 has the same arithmetic operation function as the arithmetic operation circuit of FIG. 5.

The input signal $\bar{X}$ and signal $\bar{Y}$ are input to the input latch circuit LT1 consisting of the CMOS inverters $IV_{11} \sim IV_{13}$ and the input latch circuit LT2 consisting of the CMOS inverters $IV_{21} \sim IV_{23}$ and thereby the signals X, $\bar{X}$, Y, $\bar{Y}$ of the true level and false level are formed and maintained. Of the inverters $IV_{11} \sim IV_{23}$, $IV_{11}$ and $IV_{12}$, $IV_{21}$, $IV_{22}$ are clocked inverters.

In the stage next to said input latch circuit, the logic process part LG consisting of the switch array where the N-channel type MOSFETs are arranged like a matrix is provided. Although not restricted particularly, this embodiment provides 10 switch columns, each of which is formed by a pair of serially connected N-MOS and the true and false input signals X or $\bar{X}$ and Y or $\bar{Y}$ formed by said input latch circuits LT1, LT2 are respectively applied selectively to the gate terminals of N-MOS of each switch column.

The source side of the switch column of transistors $Q_{11}$, $Q_{12}$, switch column of $Q_{21}$, $Q_{22}$, switch column of $Q_{31}$, $Q_{32}$, switch column of $Q_{41}$, $Q_{42}$ and switch column of $Q_{51}$, $Q_{52}$ among these switch columns is connected to the ground potential of circuit through the common transistor $Q_{01}$. Simultaneously, the sense circuit SA1 in the next stage is connected to the drain side of the switch column of transistors $Q_{11}$, $Q_{12}$, switch column of $Q_{21}$, $Q_{22}$ and switch column of $Q_{31}$, $Q_{32}$. Here, the signal $\bar{X}$ is applied to the gate of transistors $Q_{11}$, while the signal $\bar{Y}$ to the gate of $Q_{12}$. For this purpose, said switch column $Q_{11}$, $Q_{12}$ executes the NOR logic operation in which an output (level of node $n_1$) is set to low level only when both signals X, Y are high level under the condition that the transistor $Q_{01}$ is in the ON state.

Said sense circuit SA1 (SA2) is formed by the grounded emitter type Schottky bipolar transistor $Q_{111}$ ($Q_{121}$) where the base terminal is connected to the output node $n_1$ ($n_2$) of logic processing part LG, P-channel MOSFET $Q_{112}$ ($Q_{122}$) connected between the base terminal of transistor $Q_{111}$ ($Q_{121}$) and the power supply voltage terminal $V_{cc}$ and P-MOSFET $Q_{113}$ connected between the collector terminal of transistor $Q_{111}$ and $V_{cc}$. Both MOSFETs $Q_{112}$ ($Q_{122}$) and $Q_{113}$ ($Q_{123}$) are caused to operate as the resistors when the ground potential is applied to the gate terminal thereof. However, such resistance value of MOSFETs $Q_{112}$ ($Q_{122}$) is selected to about 10 kohms, while that of $Q_{113}$ ($Q_{123}$) to about 200~300 ohms.

Said sense circuits SA1, SA2 sense and output an output of the logic processing part by utilizing a high transmission conductance of bipolar transistor and therefore if an output of the logic processing part LG has the amplitude as low as 0~0.8 V, the signal of almost CMOS level having high amplitude may be output to the next stage.

In addition, the logic part of logic processing part LG is formed by a single stage and its output amplitude can be lowered to 0.8 V having low amplitude and thereby a delay time of arithmetic operation circuit can be reduced remarkably. That is, in the arithmetic operation circuit as indicated in FIG. 5 formed by the six stages of CMOS gates, when a delay time per gate is set to 2 ns, the delay time of 12 ns in the circuit as a whole can be reduced only to 5 ns in the total circuit, namely 4 ns at the input latch part consisting of two stages of gates, 0.5 ns at the logic processing part consisting of N-MOS array and 0.5 ns at the bipolar type amplifier part in said arithmetic operation circuit of the embodiment explained earlier. Therefore, the operation speed can be increased almost upto 2 times in comparison with the arithmetic operation circuit of the prior art.

Moreover, since the logic function is realized by the rule logic consisting of the switch array of N-MOS, the AND logic such as said embodiment and other logic than the exclusive OR logic can also be realized easily. Thereby, logic design of arithmetic operation circuit becomes easier.

Figure 2:
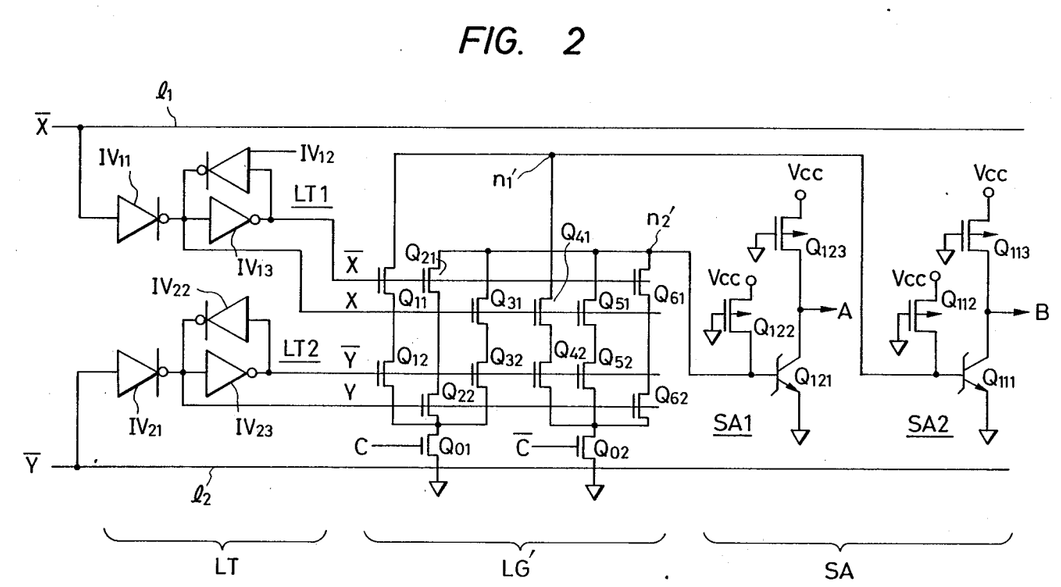
FIG. 2 is a circuit diagram indicating another embodiment of the arithmetic operation circuit of the present invention.

FIG. 2 indicates a circuit diagram of another embodiment of the present invention. The circuit diagram of FIG. 2 forms an arithmetic operation circuit like the circuit diagram of FIG. 1.

Difference between the arithmetic operation circuits of FIG. 1 and FIG. 2 lies in the structure of logic processing part. The logic processing part LG' of FIG. 2 is formed by the six switch columns $(Q_{11}, Q_{12})$, $(Q_{21}, Q_{22})$, ..., $(Q_{61}, Q_{62})$. The truth value tables of the arithmetic operation circuit of FIG. 2 are indicated in Table 5 and Table 6.

TABLE 5

| Truth Value Table with $C = 1$, $\bar{C} = 0$ in Circuit Diagram of FIG. 2 | | | | | | | |
|---|---|---|---|---|---|---|---|
| X | $\bar{X}$ | Y | $\bar{Y}$ | $n_1'$ | $n_2'$ | A | B |
| 1 | 0 | 1 | 0 | 1 | 1 | 0 | 0 |
| 1 | 0 | 0 | 1 | 1 | 0 | 1 | 0 |
| 0 | 1 | 1 | 0 | 1 | 0 | 1 | 0 |
| 0 | 1 | 0 | 1 | 0 | 1 | 0 | 1 |

TABLE 4

Truth Value Table with C = 0, $\overline{C}$ = 1 in Circuit Diagram of FIG. 2

| X | $\overline{X}$ | Y | $\overline{Y}$ | $n_1'$ | $n_2'$ | A | B |
|---|---|---|---|---|---|---|---|
| 1 | 0 | 1 | 0 | 1 | 1 | 0 | 0 |
| 1 | 0 | 0 | 1 | 0 | 0 | 1 | 1 |
| 0 | 1 | 1 | 0 | 1 | 0 | 1 | 0 |
| 0 | 1 | 0 | 1 | 1 | 1 | 0 | 0 |

As it is apparent from the truth value table of Table 5, the values of output signals A, B for the input signals, $\overline{X}$, $\overline{Y}$ indicated the truth values of half-adder circuit. Moreover, it is obvious from then truth value table of Table 6, the values of output signals A, B for the input signals $\overline{X}$, $\overline{Y}$ indicate the truth values of half-subtractor circuit. Therefore, the arithmetic operation circuit of FIG. 2 is capable of executing the adding function and subtraction function by switching them with the control signals C, $\overline{C}$.

In the case of forming a total adder circuit using the half-adder circuit of said embodiment, the carry forming circuit (carry circuit) and a half-adder circuit similar to that explained above are connected to the next stage of the sense circuits SA1, SA2.

Figure 3:
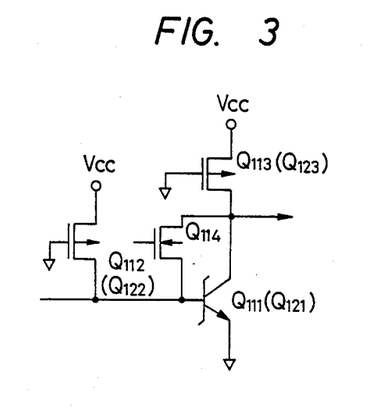
FIG. 3 is a circuit diagram indicating a modification of an amplifier part of the arithmetic operation circuit of the present invention.

In the embodiment shown in FIG. 1 or FIG. 2, when the voltage of node $n_1$ ($n_1'$) or $n_2$ ($n_2'$) is in the high level while the arithmetic operation circuit is not operable, a constant current continuously flows into the bipolar transistor $Q_{111}$ or $Q_{121}$ resulting in possibility of large power consumption. Therefore, the bipolar transistor $Q_{111}$ ($Q_{121}$) may be protected from the saturating condition by connecting MOSFET $Q_{114}$ between the base and collector of the bipolar transistor indicated in FIG. 3 and then turning ON such transistor. Thereby, it is prevented that a collector currents flow constantly and power consumption may also be reduced.

Figure 6:
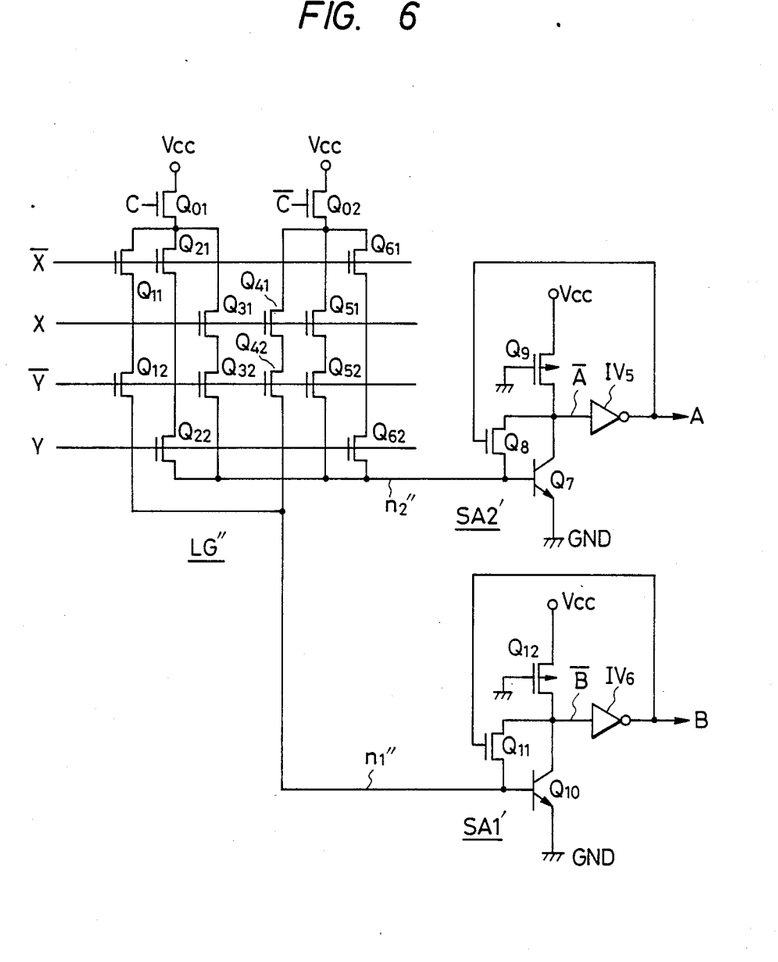
FIG. 6 is a circuit diagram indicating an embodiment of the logic processing part and amplifier part of the arithmetic operation circuit of the present invention.

FIG. 6 is the circuit of essential portion indicating another embodiment of the present invention. The logic processing part LG″ comprises the fist switch column consisting of cascade-connected MOSFETs $Q_{11}$, $Q_{12}$, the second switch column consisting of cascade-connected MOSFETs $Q_{21}$, $Q_{22}$, the third switch column consisting of cascade-connected MOSFETs $Q_{31}$, $Q_{32}$, the fourth switch column consisting of cascade-connected MOSFETs $Q_{41}$, $Q_{42}$, the fifth switch column consisting of cascade-connected MOSFETs $Q_{51}$, $Q_{52}$ and the sixth switch column consisting of cascade-connected MOSFETs $Q_{61}$, $Q_{62}$. The switch MOSFET $Q_{01}$ to which the power supply voltage $V_{cc}$ is applied to the drain thereof is provided to supply the power supply current to said fist, second and third switch columns. The source of this switch MOSFT $Q_{01}$ is connected in common to the drains of said transistors $Q_{11}$, $Q_{21}$, and $Q_{31}$. Moreover the switch MOSFET $Q_{02}$ to which the power supply voltage $V_{cc}$ is supplied to the drain thereof is provided to supply the power supply current to said fourth, fifth and sixth switch columns. The source of this switch MOSFET $Q_{02}$ is connected in common to the drains of said MOSFETs $Q_{41}$, $Q_{51}$ and $Q_{61}$. Said MOSFETs $Q_{01} \sim Q_{02}$ are turned ON selectively by the control signals C and $\overline{C}$. Thereby, switching of the arithmetic function may be conducted. The sources of MOSFETs $Q_{12}$, $Q_{42}$ are connected in common to the node $n_1''$, and the sources of MOSFETs $Q_{22}$, $Q_{32}$, $Q_{52}$ and $Q_{62}$ are connected in common to the node $n_2''$. The signal on said node $n_1''$ is amplified by the sense circuit SA1′ and thereby the output signal B is formed. The signal on said node $n_2''$ is amplified by the sense circuit SA2′ and thereby the output signal A is formed. Relationship between the input signals X, $\overline{X}$, Y, $\overline{Y}$ of the circuit indicated in FIG. 6 and the output signals A, B matches that of the circuit of FIG. 2. The sense amplifier SA1′ comprises the grounded emitter type bipolar transistor $Q_{10}$ which receives the signal on the node $n_1''$ at the base, the P-channel MOSFET $Q_{12}$ provided as the collector load resistance of such bipolar transistor $Q_{10}$ and the N-channel MOSFET $Q_{11}$ connected between the collector and base of bipolar transistor $Q_{10}$. The output signal obtained from the common connecting point of the drain of said MOSFET $Q_{12}$ and the collector of bipolar transistor $Q_{10}$ is fed back to the gate of said MOSFET $Q_{11}$ through the inverter IV6. When a driving current is supplied to the node $n_1''$ from the logic processing part LG″, the bipolar transistor $Q_{10}$ turns ON and the output signal $\overline{B}$ becomes low level. Thereby, the MOSFET $Q_{11}$ which receives the high level signal B turns ON. Since the MOSFET $Q_{11}$ becomes ON, the bipolar transistor $Q_{10}$ is not saturated. Accordingly, high speed characteristic when the bipolar transistor $Q_{10}$ turns OFF is not deteriorated.

In case the drive current is not supplied to the node $n_1''$, the bipolar transistor $Q_{10}$ turns OFF and the output signal $\overline{B}$ becomes high level. Thereby, the MOSFET $Q_{11}$ which receives the low level output signal B turns OFF. When the ON resistance of MOSFET $Q_{10}$ is set to a comparatively higher value, the output signal $\overline{B}$ becomes high level in accordance with the OFF state of said bipolar transistor $Q_{10}$. The structure of the sense amplifier SA2′ is similar to that of said sense amplifier SA1′.

According to the circuit shown in FIG. 6, low power consumption of the sense amplifier circuits S1′, SA2′ can be realized while the logic processing part LG″ is non-operable condition. That is, under the waiting condition where the control signals C, $\overline{C}$ are in the low level, since the drive current is not supplied to the nodes $n_1''$ and $n_2''$, the respective bipolar transistors $Q_{10}$, $Q_7$ forming the sense amplifiers SA1′, SA2′ are set to the OFF state. Therefore, the electrical power is not consumed uselessly in the sense amplifier circuits SA1′, SA2′.

In the sense amplifier circuit SA1′ (SA2′), a resistor means for extracting charges of base may also be provided between the base and ground potential GND of the bipolar transistor $Q_{10}$ ($Q_7$). The resistance mans is effective to improve the switching speed to the OFF state from ON state of the bipolar transistor $Q_{10}$ ($Q_7$).

Figure 7:
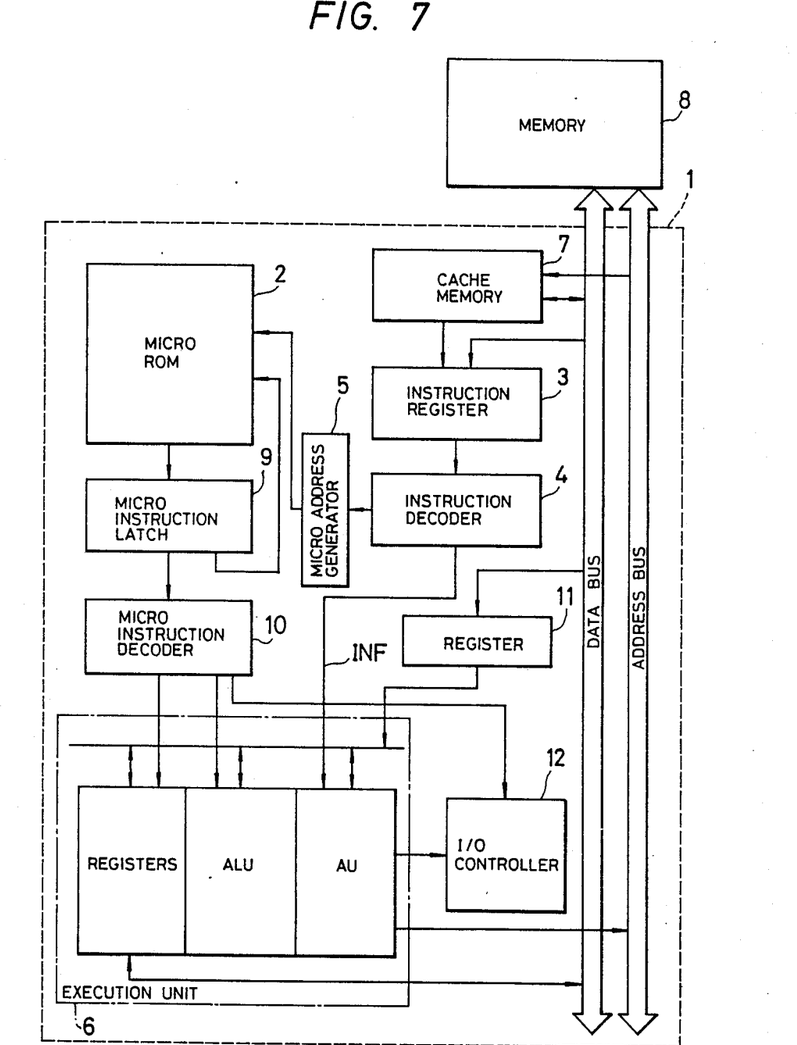
FIG. 7 is a block diagram indicating an example of the microprocessor using the arithmetic operation circuit of the present invention.

FIG. 7 is an example of the hardware structure of a microprocessor including the arithmetic operation logic unit ALU to which the arithmetic operation circuit of the present invention is adopted.

The microprocessor of this embodiment provides the control part of microprogram control system. Namely, the micro-ROM 2(Read Only Memory) storing the microprogram is provided within an LSI chip forming the microprocessor. The micro-ROM 2 is accessed by the microaddress generating circuit 2 and sequentially outputs the microinstructions forming the microprogram. To the microaddress generating circuit 5, the signal obtained by decoding the code of microinstruction fetched to the instruction register 3 with the instruction decoder 4 is supplied. The microaddress generating circuit 5 forms the corresponding microaddress on the basis of such signal and then supplies to the micro-ROM 2. Thereby, the first instruction of a series of microinstruction groups to instruct the such microinstructions can be read. By this microinstruction code, the control signal for the execution unit 6 consisting of the various kinds of temporary registers, data buffer, arithmetic operation logic unit ALU and address calculation unit AU may be formed.

The second and successive microinstructions among a series of microinstruction groups corresponding to the macroinstruction are read by supplying the code of next address field of microinstruction read just precedingly to the micro-ROM 2. That is, the microinstruction latch 9 is provided to maintain the next address in the preceding microinstruction and the second and successive microinstructions are read based on the output of said latch 9 and the address sent from the microaddress generating circuit 4. A series of microinstructions thus read are decoded by the microinstruction decoder 10, the execution unit 6 is controlled by the output control signal thereof and the macroinstructions are thus executed.

In this embodiment, although not restricted particularly, a buffer storing system is employed, a cash memory 7 is provided within the microprocessor LSI and the program data having high access frequency among the data in the external memory 8 are registered in the cash memory 7. Thereby, program fetch is carried out at a high speed.

The address calculation unit AU calculates addresses of operand on the basis of information of the extended part for designating operand address and the specified register within the execution unit 6. Said extended part is supplied to the address calculation unit AU through the register 11 only for the extended part without decoding by the instruction decoder 4. Moreover, the address calculation unit AU is controlled by the address calculation control information INF obtained by decoding the instruction including the operand designation part.

As explained previously, the arithmetic operation circuit of the present invention comprises an input latch part which is formed by the CMOS inverter circuit and forms and holds the complementary signal of the input signal, a logic processing part which is formed by the switch array which is turned ON and OFF by the signal latched by said input latch part and executes the logic operation and an amplifier part which is formed by the grounded emitter type bipolar transistor and amplifies the logic output of low amplitude obtained by said logic processing part. Therefore, since change of amplitude of signal obtained by the logic processing part is amplified by the high transmission conductance of bipolar transistor, the amplitude of logic output of the logic processing part consisting of the N-MOS array can be made small and the logic signal can be processed by only one stage. Accordingly, the logic operation can be executed almost without delay and thereby the effect that high speed operation can be realized without deterioration of low power consumption characteristic of logic circuit can be attained.

While the invention proposed by the inventors of the present application has been described with respect to a specific embodiment thereof, it is to be understood that the present invention is not limited thereto in any way but covers any and all changes and modifications which will become possible within the scope of the appended claims. For example, in above embodiment, it is explained that the transistors $Q_{112}$, $Q_{122}$ forming the sense circuits SA1, SA2 are formed by the Schottky bipolar transistor but it is not limited only to the Schottky type and also may be formed by the ordinary bipolar transistor.

In above explanation, the invention by the inventors of the present application is adopted to the arithmetic operation circuit which forms the arithmetic operation logic unit such as a microcomputer which is the application field as the background thereof. This invention is not limited thereto, however, and it may also be used generally to the arithmetic operation device and ordinary logic circuit in the logic integrated circuit using CMOS circuit.

What is claimed is:

1. An arithmetic operation circuit comprising:
   a logic processing means which includes a first MOSFET column cascade-connecting a plurality of MOSFETS and a second MOSFET column cascade-connecting a plurality of MOSFETS, wherein first and second ends of the second MOSFET column are respectively coupled to first and second ends of said first MOSFET column, wherein a first power supply voltage lead is coupled to the common connecting point of the first end of said first MOSFET column and the first end of said second MOSFET column, and wherein said plurality of MOSFETS in said first and second MOSFET columns are of a first conductivity type and have their gates coupled to receive input signals to be processed by said arithmetic operation circuit and provide to the common connecting point of the second end of said first MOSFET column and the second end of the second MOSFET column an output signal in accordance with a logic operation of said first and second MOSFET columns; and
   an amplifying means including the grounded emitter type bipolar transistor in which the base thereof is connected to the common connecting point of the second end of said first MOSFET column and the second end of said second MOSFET column.

2. An arithmetic operation circuit according to claim 1, wherein said amplifying means further comprises a resistance means of which one end is connected to the collector of said grounded emitter type bipolar transistor and the other end receives a supply of a second power supply voltage level.

3. An arithmetic operation circuit according to claim 2, wherein said first power supply voltage level is a ground potential level and said second power supply voltage level is a positive power supply voltage level.

4. An arithmetic operation circuit according to claim 1, wherein said amplifying means further comprises a resistance means of which one end is connected to the collector of said grounded emitter type bipolar transistor and the other end receives the supply of said first power supply voltage level.

5. An arithmetic operation circuit according to claim 4, wherein said first power supply voltage level is a positive power supply voltage level.

6. An arithmetic operation circuit for a microprocessor comprising:
   a first terminal to which a first power supply voltage is applied;
   a second terminal to which a second power supply voltage smaller than said first power supply voltage is applied;
   input terminals to which input signals to be processed by said arithmetic operation circuit are applied;
   an output terminal;

logic processing means for performing a predetermined logic operation and including an output node, a first logic circuit having a plurality of first MOSFETS of a first conductivity type, source-drain paths of which are coupled in series between said output node and a selected terminal selected from said first and second terminals, gates of which are coupled to first predetermined input nodes, and a second logic circuit having a plurality of second MOSFETS of said first conductivity type, source-drain paths of which are coupled in series between said output node and said selected terminal, gates of which are coupled to second predetermined input nodes, so that said logic processing means provides an output signal to said output node in accordance with operations of said first and second logic circuit; and amplifier means coupled to said output node of said logic processing means for amplifying said output signal, and including a bipolar transistor coupled to have its collector-emitter path coupled between said output terminal and said second terminal and its base coupled to receive said output signal of said logic processing means, and a resistor element coupled between said first terminal and said output terminal.

7. An arithmetic operation circuit according to claim 6, wherein said resistor element includes a MOSFET of a second conductivity type opposite to said first conductivity type, a source-drain path of which is coupled between said first terminal and said output terminal, a gate of which is coupled to said second terminal.

8. An arithmetic operation circuit according to claim 7, wherein said first conductivity type is an N-channel conductivity type, and said second conductivity type is a P-channel conductivity type, and wherein said bipolar transistor is an NPN bipolar transistor having its collector coupled to said output terminal and its emitter coupled to said second terminal.

9. An arithmetic operation circuit according to claim 8, wherein said NPN bipolar transistor includes a Schottky bipolar transistor.

10. An arithmetic operation circuit according to claim 6, wherein said selected terminal is said first terminal.

11. An arithmetic operation circuit according to claim 6, wherein said amplifier means further includes another resistor element coupled between said first terminal and said base of said bipolar transistor, sand wherein said selected terminal is said second terminal.

12. An arithmetic operation circuit according to claim 6, further comprising a switching element coupled between said selected terminal and the respective source-drain paths of said first and second MOSFETS of said first and second logic circuits for selectively coupling the respective source-drain paths of said first and second MOSFETS of said first and second logic circuits to said selected terminal.

13. An arithmetic operation circuit according to claim 12, wherein said switching element includes a MOSFET.

14. A half adder circuit is an arithmetic operation unit for a one-chip microcomputer comprising:
a first terminal for supplying a first power supply voltage;
a second terminal for supplying a second power supply voltage smaller than said first power supply voltage;

a plurality of input terminals to which input signals $(X, \overline{X}, Y, \overline{Y})$ are applied, respectively;
first and second output terminals;
a logic processing circuit including first and second output nodes, first and second MOSFETS having their source-drain paths coupled between said first output node and a selected terminal selected from said first and second terminals and their gates respectively coupled to receive input signals $(\overline{X}, Y)$, third and fourth MOSFETS having their source-drain paths coupled between said first output node and said selected terminal and their gates respectively coupled to receive said input signals $(X, \overline{Y})$ and fifth and sixth MOSFETS having their source-drain paths coupled between said second output node and said selected terminal, and their gates respectively coupled to receive said input signals $(\overline{X}, \overline{Y})$, wherein said first to sixth MOSFETS are all of a first conductivity type;
a first bipolar transistor coupled to, have a base coupled to said first output node and a collector-emitter path coupled between said first output terminal and said second terminal;
a first resistor element coupled between said first terminal and said first output terminal;
a second bipolar transistor coupled to have a base coupled to said second output node and a collector-emitter path coupled between said second output terminal and said second terminal; and
a second resistor element coupled between said first terminal and said second output terminal.

15. A half adder circuit according to claim 14, wherein said selected terminal is said first terminal.

16. A half adder circuit according to claim 14, further comprising:
a third resistor element coupled between said first terminal and said base of said first bipolar transistor; and
a fourth resistor element coupled between said first terminal and said base of said second bipolar transistor,
wherein said selected terminal is said second terminal.

17. A half adder circuit according to claim 14, wherein said first to sixth MOSFETS are N-channel MOSFETS.

18. A half adder circuit according to claim 14, wherein said first and second bipolar transistors are Schottky NPN bipolar transistors.

19. A half adder circuit according to claim 14, further comprising means for preventing said first and second bipolar transistors from going into a saturation condition.

20. A half subtractor circuit in an arithmetic operation unit for a one-chip microcomputer comprising:
a first terminal for supplying a first power supply voltage;
a second terminal for supplying a second power supply voltage smaller than said first power supply voltage;
a plurality of input terminals to which signals $(X, \overline{X}, Y, \overline{Y})$ are applied, respectively;
first and second output terminals;
a logic processing circuit including first and second output nodes, first and second MOSFETS having their source-drain paths coupled between said first output node and a selected terminal selected from said first and second terminals and their gates respectively coupled to receive said signals $(\overline{X}, Y)$, third and fourth MOSFETS having their source-drain paths coupled between said first output node and said selected terminal and their gates respectively coupled to receive said signals (X,$\overline{Y}$) and fifth and sixth MOSFETS having their source-drain paths coupled between said second output node and said selected terminal, and their gates respectively coupled to receive said signals ($\overline{X}$,$\overline{Y}$), wherein said first to sixth MOSFETS are all of a first conductivity type;

a first bipolar transistor coupled to have a base coupled to said first output node and a collector-emitter path coupled between said first output terminal and said second terminal;

a first resistor element coupled between said first terminal and said first output terminal;

a second bipolar transistor coupled to have a base coupled to said second output node and a collector-emitter path coupled between said second output terminal and said second terminal; and a second resistor element coupled between said first terminal and said second output terminal.

21. A half subtractor circuit according to claim 20, wherein said selected terminal is a first terminal.

22. A half subtractor circuit according to claim 20, further comprising:

a third resistor element coupled between said first terminal and said base of said first bipolar transistor; and a fourth resistor element coupled between said first terminal and said base of said second bipolar transistor, wherein said selected terminal is said second terminal.

23. A half substractor circuit according to claim 20, wherein said first to sixth MOSFETS are N-channel MOSFETS.

24. A half substractor circuit according to claim 20, wherein said first and second bipolar transistors are Schottky NPN bipolar transistors.

25. A half substractor circuit according to claim 20, further comprising means for preventing said first and second bipolar transistors from entering into a saturation condition.

* * * * *